(12) United States Patent
Zicher

(10) Patent No.: US 6,963,036 B1
(45) Date of Patent: Nov. 8, 2005

(54) ACCURATE, HIGH SPEED WEIGHING APPARATUS AND METHOD

(76) Inventor: Heinz Zicher, 1535 N. Douglas Ave., Arlington Heights, IL (US) 60004

( * ) Notice: Subject to any disclaimer, the term of this patent is extended or adjusted under 35 U.S.C. 154(b) by 79 days.

(21) Appl. No.: 10/286,067

(22) Filed: Nov. 1, 2002

(51) Int. Cl.$^7$ .................. G01G 23/06; G01G 19/00
(52) U.S. Cl. ............... 177/185; 177/199; 177/200; 177/210 FP
(58) Field of Search ............... 177/185, 199, 177/200, 210 FP

(56) References Cited

U.S. PATENT DOCUMENTS

| | | | |
|---|---|---|---|
| 3,446,299 A | 5/1969 | Leonowicz | 177/25 |
| 3,589,457 A * | 6/1971 | Joos | 377/22 |
| 3,731,754 A | 5/1973 | Godwin et al. | 177/165 |
| 4,102,421 A | 7/1978 | Ozaki et al. | 177/185 |
| 4,212,361 A | 7/1980 | Stocker | 177/200 |
| 4,417,631 A * | 11/1983 | Johnson | 177/210 FP |
| 4,593,778 A | 6/1986 | Konishi et al. | 177/185 |
| 4,624,331 A * | 11/1986 | Naito | 177/185 |
| 4,926,359 A | 5/1990 | Konishi et al. | 364/567 |
| 4,961,533 A * | 10/1990 | Teller et al. | 177/25.19 |
| 5,117,929 A | 6/1992 | Nakamura et al. | 177/185 |
| 5,646,375 A * | 7/1997 | Neuman | 177/54 |
| 5,700,982 A * | 12/1997 | Neuman | 177/229 |
| 5,736,685 A * | 4/1998 | Nakajima | 177/145 |
| 5,789,713 A * | 8/1998 | Wakasa et al. | 177/25.13 |
| 5,991,676 A * | 11/1999 | Podoloff et al. | 701/45 |
| 6,013,879 A | 1/2000 | Nakamura et al. | 177/25.13 |
| 6,284,987 B1 * | 9/2001 | Al-Modiny | 177/170 |
| 6,307,165 B1 * | 10/2001 | Komoto | 177/229 |
| 6,313,415 B1 * | 11/2001 | Maher et al. | 177/25.13 |

* cited by examiner

Primary Examiner—Randy W. Gibson
(74) Attorney, Agent, or Firm—Welsh & Katz, Ltd.; Thomas R. Vigil

(57) ABSTRACT

The static or dynamic weighing apparatus for weighing an object or item, comprising a weighing assembly that includes a base with four (4) load cells attached to it, two (2) active load cells and two (2) passive load cells. Each active load cell has a mounting side and a weighing side. They are mounted to the base and to each other via a rigid weighing platform and are rotated 180° with respect to each other in the horizontal plane, thereby generating respective inverse error signals when an object or item is placed on or passes over the weighing platform. The two (2) passive load cells are mounted in the same manner. A combination of the voltage outputs from each of the respective two (2) load cells pairs negates all horizontally and vertically induced errors thus yielding a highly accurate two (2) times normal weight signal of the object or item being weighed. Error voltages felt by the passive assembly, representing any present vertical vibration, is removed via electrical circuitry from the actual active weighing voltage output, resulting in a true weight of the object or item being weighed. The resulting output voltage over the designated time interval then represents the true weight of the object or item being weighed. A voltage-to-frequency converter is employed to transmit the corrected true frequency output due to the actual analog output voltage resulting from the active weight being measured to a binary counter over a pre-specified time period. By counting a pulse train that varies directly to the applied voltage over a specified period of time results in a natural averaging weight and the resulting count is the average and true count of the representative weight of the object or item being weighed.

16 Claims, 7 Drawing Sheets

ACCURATE, HIGH SPEED WEIGHING APPARATUS AND METHOD

BACKGROUND OF THE INVENTION

1. Field of the Invention

The present invention relates to the weighing of items by employing a four (4) load cell configuration that permits for the optimum cancellation of all ambient environmental vibration in both the horizontal and vertical planes. The four load cell configuration is implemented in an apparatus where a tare weighing and a gross weighing are always performed for each and every item presented for weighing so to avoid all adverse temperature effects. The apparatus is used for both "static" and "dynamic" weighing. In a static configuration, the item is placed and removed from the weighing assembly using robotics, etc., while for a dynamic configuration the items are conveyed across the weighing assembly using some sort of conveyance mechanism. For static weighing, a minimum weighing rate of one (1) tare and gross weight reading per presentation per second is provided. For dynamic weighing, a rate of weighing of up to ten (10) tare and gross weight readings per second of twenty (20) weight readings per second in total are provided.

2. Description of the Prior Art

Heretofore, various mechanical and electrical systems have been proposed for correcting for environmental vibrations in weighing systems. Examples of analogous and non-analogous systems are disclosed in the following analogous and non-analogous U.S. Patents.

| U.S. Pat. No. | Patentee |
| --- | --- |
| 3,446,299 | Lenowicz |
| 3,731,754 | Godwin, et al. |
| 4,102,421 | Ozaki, et al. |
| 4,212,361 | Stocker |
| 4,593,778 | Konishi, et al. |
| 4,926,359 | Konishi, et al. |
| 5,117,929 | Nakamura, et al. |
| 6,013,879 | Nakamura, et al. |

U.S. Pat. No. 3,446,299 to Lenowicz, U.S. Pat. No. 3,731,754 to Godwin, U.S. Pat. No. 4,102,421 to Oazki, U.S. Pat. No. 4,926,359 to Konishi, U.S. Pat. No. 5,117,929 to Nakamura and U.S. Pat. No. 6,013,879 to Nakamura all teach some form of Analog to Digital conversion in a weighing apparatus. They all take one or more analog weight readings and perform an instantaneous conversion at a fixed point in time. The point in time selected might just happen to be a point in time when significant vibration is being experienced, thus resulting in inferior data.

U.S. Pat. No. 3,446,299 to Lenowicz teaches a data clocking method somewhat similar to the data clocking method disclosed herein.

U.S. Pat. No. 3,731,754 to Godwin teaches a count that is output as a pulse train of fixed frequency.

As will be described in greater detail hereinafter, in the apparatus of the present invention a voltage-to-frequency (V/F) conversion is performed. Such voltage-to-frequency conversion functions substantially different from an analog-to-digital (A/D) conversion. Instead of purely converting an analog signal to a digital signal at a specified fixed point in time, the operation of a voltage-to-frequency converter is such that a continuous pulse train is always present. The frequency, or time period of the pulse, observed coming out of the V/F converter at a given point in time is the instantaneous reflection of the analog voltage at the input to the V/F converter at that very same given point in time. The represented output frequency is always linearly proportional to the input analog voltage level. Therefore, it becomes obvious, that as the input analog voltage fluctuates, the output frequency pulse train will fluctuate as well, in a linear manner. It follows that if a pulse train containing fluctuations in frequencies is accumulated over a fixed time interval, the final count represents an average of the analog voltage applied during that entire fixed time interval. Employed in this fashion, a V/F conversion over a fixed time interval, is an electronic natural means of averaging out noise present on an analog signal, be it Johnson Noise, or other random noise components, so long as they are significantly shorter in period than is the fixed time sampling interval.

Many benefits result from transmitting such a continuously varying digital pulse train. Being digital in nature the pulse train is not susceptible to undesirable electrical noise interference found in hostile environments like in a factory. Moreover, the data can be transmitted over great distances using coaxial cable, fiber-optics, etc. Then, at the receiving end, the data pulses need only to be accumulated over the desired fixed time interval in a counter. Therefore, unlike an A/D converter where numerous conversions may have to be performed and then averaged by the computing device, with V/F conversion, once the fixed time accumulation of pulses has expired, the computing device need merely read the counter.

U.S. Pat. No. 4,212,361 to Stocker, U.S. Pat. No. 4,593,778 to Kornishi, U.S. Pat. No. 4,926,359 to Kornishi, U.S. Pat. No. 5,117,929 to Nakamura and U.S. Pat. No. 6,013,879 to Nakamura all teach the use of a second or dummy load cell in a weighing apparatus.

U.S. Pat. No. 6,013,879 to Nakamura's shows sloping load output lines resulting from the use of two load cells. However this patent does not teach applying a load traversing rigid member connecting the two active cells or connecting two passive load cells. The rigid member serves two purposes. The main purpose is for the reduction of all horizontal vibration components based on the 180 degree out of phase mounting of the two respective load cells connected by the rigid member. The second purpose is for attaching a weighing surface to it, across which is conveyed a dynamic weighing. It is an expectation that the resulting sloping load cell output signals, the slope opposite for each respective load cell, are the result of the load being conveyed across the weighing surface, by physically starting immediately above one load cell and ending up immediately above the other load cell. In between are varying degrees of load exerted on the load cells when an object is somewhere in-between them.

As will be described in greater detail hereinafter in the weighing apparatus of the present invention, four load cells are employed. Each set of two load cells (serving as one assembly) are used to cancel-out horizontal vibration noise components. The additional set of two load cell assemblies further provide a mechanism for canceling-out vertical vibration noise components.

BRIEF SUMMARY OF THE INVENTION

An analog voltage-to-frequency conversion circuit is employed in addition to optical-isolation, for the purpose of transmitting acquired weight data over large distances. This methodology is selected in order to eliminate adverse environmental electrical noise interference as well as to avoid any potential ground loop problems. In addition, the use of an analog voltage-to-frequency conversion is to also average out random electrical system noise that is always present in electronic systems. The reconstruction of the original analog weight signal employed at the receiver module end using a frequency-to-analog voltage conversion circuit is for setting up and alignment and the adjustment for the proper pulse counting time interval in relation to the realization of stable weight data. The weight data output comprises sixteen (16) sourced output levels of optically isolated digital data bits that can be processed via either a PLC (programmable logic controller) or an industrial PC (personal computer). Circuitry is provided for detecting when a weight data reading should occur, whether by edge detection of the in-position presented item, a linear encoder from a servo motor, etc. for the purpose of triggering the counter that will accumulate the weight data pulses transmitted representative of the actual weight.

Though the preferred embodiment of this invention is used to weigh items by having them exert a normal weight force on a weighing platform (compression), this application is equally applicable for weighing suspended items (tension.)

Further, in the weighing apparatus of the present invention, a tare weight data reading is made after or before a gross weight data reading is made and subtracted from the gross weight reading so that all adverse weighing results due to a change in temperature are obviated.

When two identical load cells are mounted 180° out of phase with respect to one another on the same physical mounting base and connected via a common rigid member, it must follow that each load cell experiences the same applied horizontal forces in both the X and the Y-planes. Because both load cells are identical in make and model number per the manufacturer, both load cells need to respond similarly to any applied horizontal force. A horizontal force creates a small extraneous but undesirable output that is superimposed on the desirable load cell output from an applied normal force. Therefore, if an applied horizontal force in the X-plane creates a +δ (delta) change in output voltage in one load cell it must create a −δ change in the other load cell since it is rotated by 180° or out-of-phase with the first load cell. This is similarly applicable in the Y-plane. Therefore, the net change in output voltage from the two load cells after summing results in just the normal applied weight component, since all 6 changes due to any horizontally applied forces will theoretically cancel in both the X and Y-planes.

A load cell's output voltage resolution, though tiny in magnitude, is theoretically infinite, subject to the effect of Johnson Noise (thermal noise resulting from any resistive components.) Therefore, according to the teachings of the present invention the load cells employed in the weighing solution have a weighing capacity that significantly exceeds the capacity of the object or item being weighed. For instance, a one kilogram load cell might be employed to weigh a ten gram object or item; in this case only 1% of the load cell's capacity is being employed. Benefits clearly follow; deformation of the load cell is proportional to the applied load—if the full capacity deformation is 0.003 inches, it follows that the maximum deformation of the load cell is now only 0.000,03 inches. Also the voltage outputs due to the natural ringing frequency of the load cell, though still at the same frequency, are significantly reduced in amplitude requiring less filtering. Finally, the ringing frequencies can be kept significantly higher than by using a load cell for the stated capacity of the item to be weighed.

A further benefit from employing only a fraction of the capacity of a load cell is that any detrimental influences resulting from a load cell's hysteresis is minimized.

DETAILED DESCRIPTION OF THE INVENTION

Figure 1:
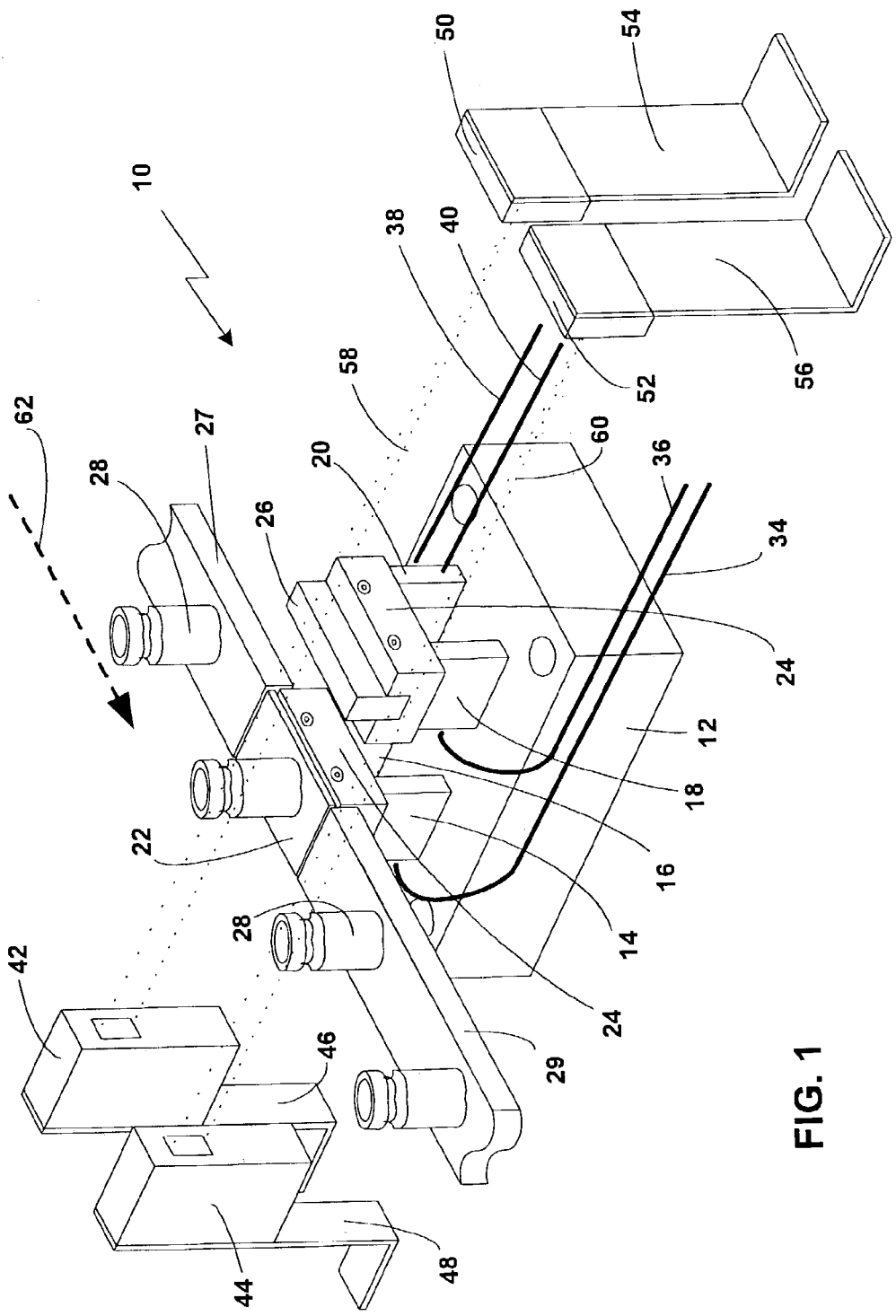
FIG. 1 is a perspective view of a weighing acquisition apparatus constructed according to the teachings of the present invention.

Referring now to the drawings in greater detail, there is illustrated in FIG. 1 a very accurate, high speed weighing apparatus 10 constructed according to the teachings of the present invention.

The weighing apparatus comprises a base 12 mounting four load cells 14, 16, 18 and 20. The first two cells 14 and 16 are active load cells and are rigidly connected together by an "active" weighing platform 22 which extends between the parallel spaced active load cells 14 and 16.

The other two load cells 18 and 20 are "passive" load cells which are rigidly connected together by a rigid member 24. A passive load 26 is mounted on the rigid member 24 by set screws for offsetting or countering the vibration noise induced weight of the weighing and the load thereon being weighed.

An in-feed rail 27 is positioned adjacent to one side of the weighing platform 22. Objects 28 to be weighed are conveyed by a conveying mechanism, not shown, along the in-feed rail 27 to the weighing platform 22 and then exit the weighing platform 22 on a discharge rail 29. The objects 28, shown in FIG. 1 are small glass vials each having a precise quantity of liquid therein. The conveying mechanism is not shown in FIG. 1 so as not to complicate the illustration of the weighing apparatus 10 and the type of conveying mechanism used is not material to the weighing apparatus 10 or method.

The passive load 26 has a weight that approximates the weight of each of the objects 28 and the weighing platform 22, which is situated immediately above rigid member 24.

As shown, the passive load cells 18 and 20 are parallel spaced from and inline with the active load cells 14 and 16.

Figure 1A:
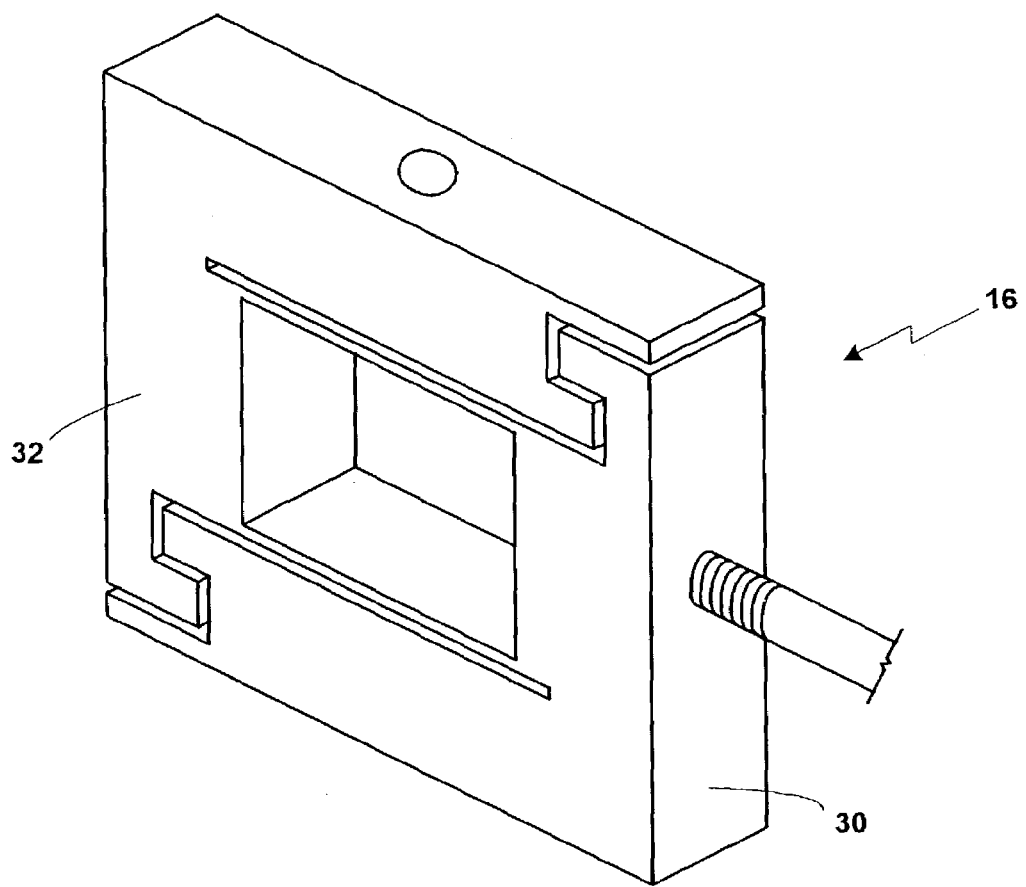
FIG. 1A is an enlarged perspective view of one of the strain gauge type load cells used in the weighing apparatus shown in FIG. 1.

As shown in FIG. 1A, each of the load cells 14–20 has a mounting side 30 and a weighing side 32. The load cells 14–20 are strain gauge type cells which are available from a number of manufacturers. In one embodiment of the weighing apparatus 10 of the present invention, Futech Model L2357 load cells were used. These load cells are made by Futech, Inc. of Irvine, Calif.

As shown, in FIG. 1 the load cells 14 and 18 are in-line with each other and each load cell 14 and 18 has a cable 34 and 36, respectively, each with four wire conductors therein connected to the strain gauge in each load cell 14 and 18 and extending from the mounting side 30.

The other two strain gauge type load cells 16 and 20 have the opposite orientation to the orientation of the strain gauge type load cells 14 and 18 such that the mounting side 30 of the strain gauge type load cell 14 is opposite the weighing side 32 of the strain gauge type load cell 16 and has a cable 38 and 40 respectively connected thereto. Likewise, for the passive load cells 18 and 20, the passive load cell 18 mounting side 30 is opposite the weighing side 32 of the passive load cell 20.

Figure 2:
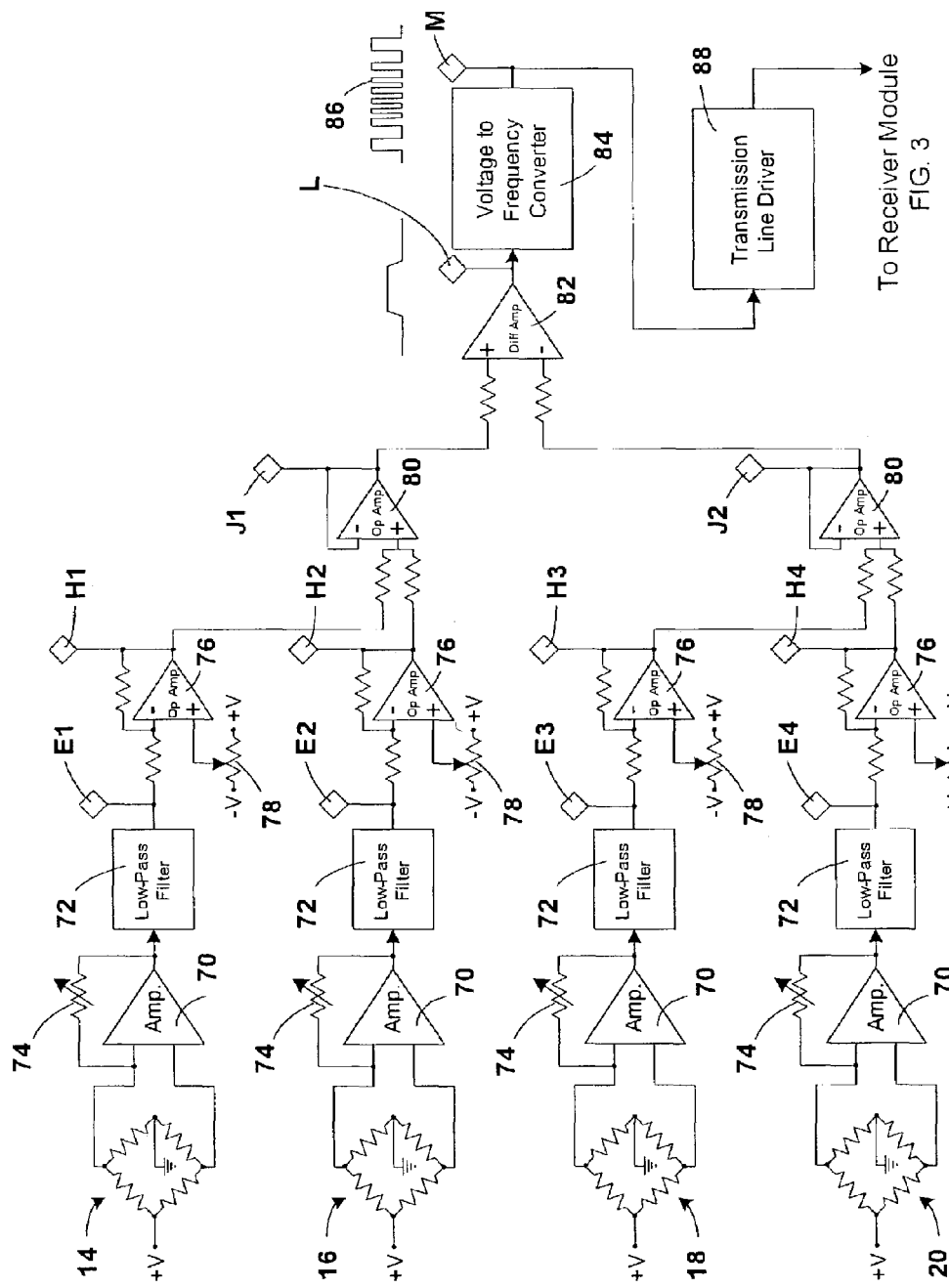
FIG. 2 is a schematic electrical circuit diagram for a transmitter module for the apparatus shown in FIG. 1 constructed according to the teachings of the present invention.

The cable 36 goes to an instrumentation amplifier in the transmitter module shown in FIG. 2. The two load cells 14 and 16 are mounted 180° out-of-phase with respect to each other. This can be observed by the fact that the respective cables 34 and 38 exit load cells 14 and 16 in opposite directions as do the cables 36 and 40 from the load cells 18 and 20.

An important feature of the present invention is the rigid connecting of the weighing platform 22 to the active load cells 14 and 16 and the rigid connection of the rigid member 24 to the passive load cells 18 and 20.

The opposite orientation of the active load cells 14 and 16 and likewise of the passive load cells 18 and 20 is important to the teachings of the present invention since it provides inverse weighing signals from each pair of load cells 14 and 16 or 18 and 20, resulting from the affects of horizontally induced vibration applied to both load cells.

As a result of the opposite orientations of the active load cells 14 and 16 and the opposite orientations of the passive load cells 18 and 20 and the rigid connecting of each pair of load cells 14 and 16 or 18 and 20, vibrations and noise generated in the X, Y and Z planes is cancelled out by combining the signals generated by the four different load cells 14–20 as will be explained in greater detail hereinafter in connection with the description of FIG. 2.

Referring again to FIG. 1, two spaced apart photoelectric emitter/sensors 42 and 44 are mounted on mounting brackets 46 and 48 that are spaced outwardly from one side of the weighing platform 22 and discharge rail 29. On the other side of the discharge rail 29, weighing platform 22 and weighing apparatus 10 there are located reflecting mirrors 50 and 52 mounted on respective mounting brackets 54 and 56.

Figure 3:
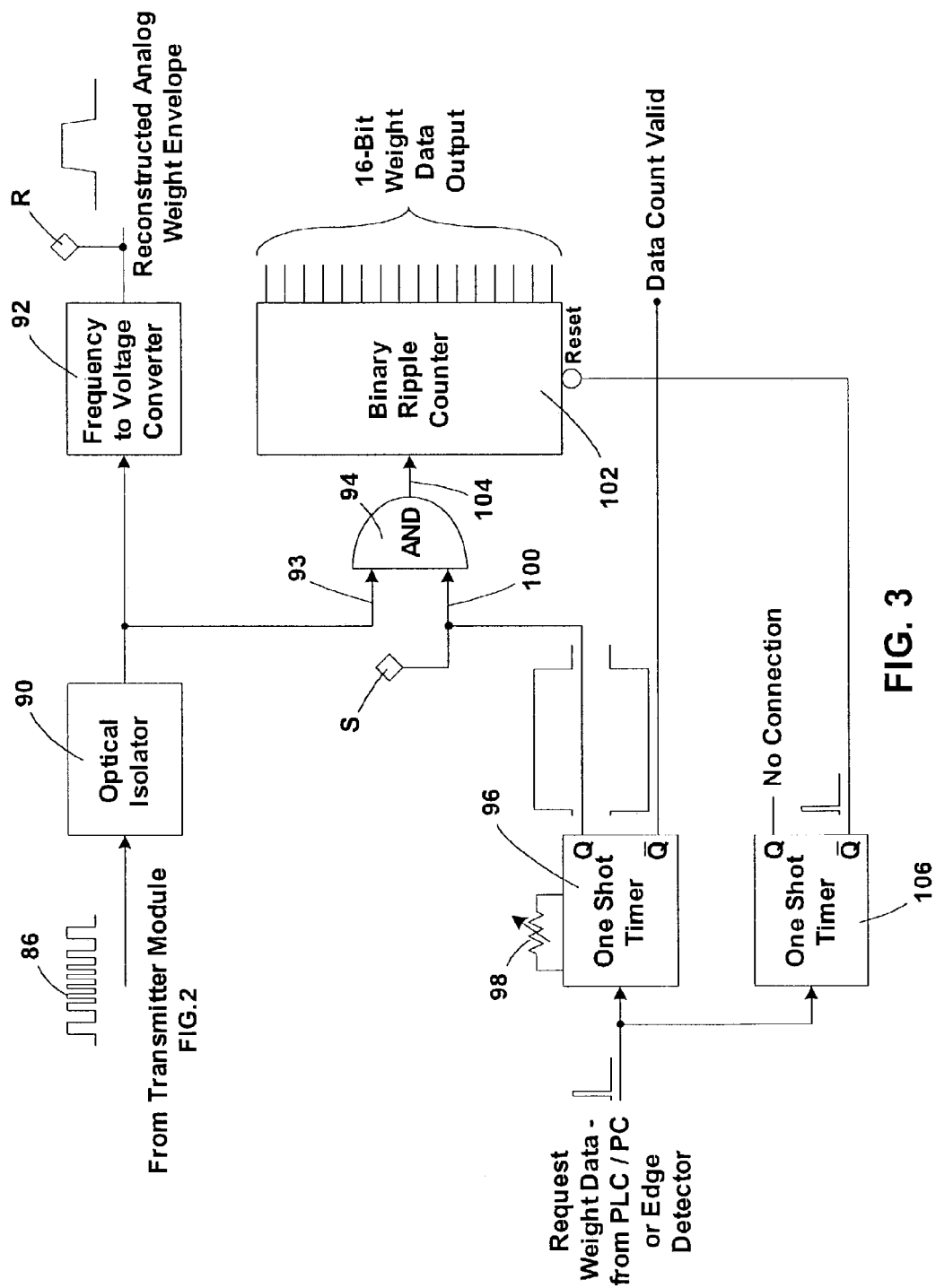
FIG. 3 is a schematic electrical circuit diagram for a receiver module for the apparatus shown in FIG. 1 constructed according to the teachings of the present invention.
Figure 6:
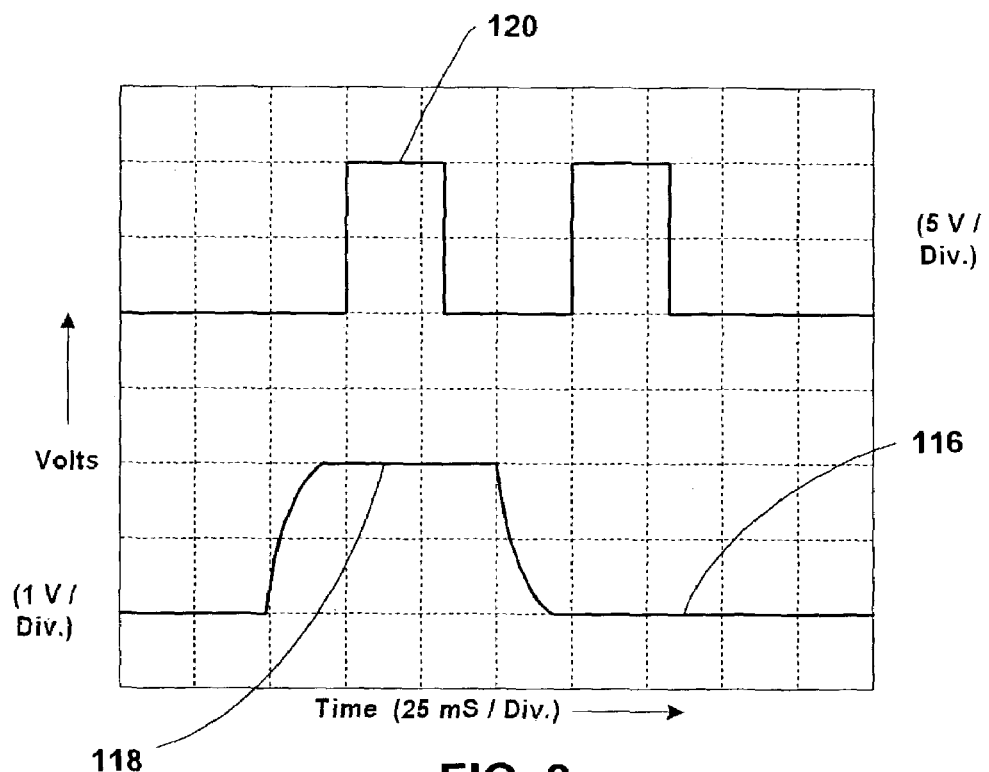
FIG. 6 is a graph of voltage versus time and shows the voltage generated at a Q output at node S of a One Shot shown in FIG. 3 versus the voltage at node R at the output of a Frequency to Voltage Converter shown in FIG. 3.

The photoelectric sensor 42 senses the leading edge of an object or vial 28 over the weighing platform 22 and triggers a signal to a first one-shot-timer in the receiver module shown in FIG. 3, which then commences the counting of pulses for a representation of the item's gross weight. It is positioned so that it triggers the first one shot timer when an analog weight signal is stable, as shown in FIG. 6.

The photoelectric sensor 44 senses the leading edge of an object or vial 28 over the discharge rail 29 and triggers a signal to the first one-shot-timer in the receiver module shown in FIG. 3, which then commences the counting of pulses for a representation of the non-item's weight (tare or no load weight.) This photoelectric sensor 44 could also be positioned over the in-feed rail 27 instead of the discharge rail 29.

The mirror or photo reflector 50 is paired with photoelectric sensor 42 used for the edge detection of an object or vial 28 for which a gross weight count is to be taken.

The mirror or photo reflector 52 paired with photoelectric sensor 44 used for the edge detection of an object or vial 28 for which a tare weight count is to be taken. It should be noted that an object or vial 28 has just been conveyed off the weighing platform 22 when such edge detection takes place, such that at this instance in time, no load of any type is on the weighing platform 22.

Between the emitter/sensor 42 and mirror 50 are shown dotted lines 58 which indicate a transmitted light beam for edge detection of the objects or vials.

Between the mirror 52 and the emitter/sensor 44 are shown dotted lines 60 which indicate a reflection of the transmitted light beam 60 indicating that no item is breaking the light beam.

An arrow 62 indicates the direction of motion of the objects or vials 28.

The photoelectric emitter/sensors 42 and 44 can be of any commercial type and in one embodiment of the weighing apparatus 10 of the present invention they were edge detectors made by Keyence of Woodcliff Lake, N.J., Keyence Model No. PZ-M Photoelectric sensor.

As shown in FIG. 1 the photoelectric sensor 42 will have a leading edge detection as an object 28 is conveyed onto the weighing platform 22.

Subsequently, the object will create a leading edge signal as it passes the light beam path from the photoelectric emitter/sensor 44 for a tare weight reading, i.e., so that a tare weighing signal can be generated when no object 28 is present on the weighing platform 22.

Referring now to the circuit diagram shown in FIG. 2, the strain gauge type load cells 14 and 16 will generate inverse signals which are then amplified by an instrumentation amplifier 70 and then passed through a low pass filter 72.

The load cells 14–20 are typically resistive foil strain-type load cells or they can be any other type of load cell. The load cells 14 and 16 are used to present the active weight load output and ambient environmental vibration outputs while load cells 18 and 20 are used to present only the ambient environmental vibration output. The load cells 14 and 16 are mounted 180° out-of-phase in the horizontal plane (shown in FIG. 1) as are load cells 18 and 20. This accomplishes noise cancellation in the horizontal plane while still providing an analog weight output for the normal force. By subtracting the resulting analog weight outputs found in the summed load cell outputs of load cells 18 and 20 from those of the summed load cell outputs of load cells 14 and 16, in theory, only the resulting output signal representing the true weight measurement of the object or vial to be weighed results. In one preferred embodiment of the weighing apparatus 10, load cell "compression" is used to measure normal positive forces. By reversing the differential input voltages to all load cells 14–20 (by switching the two sensing wires) the assembled weighing base can be literally inverted to operate in the "tension" mode for weighing suspended loads.

The instrumentation amplifiers 70 are used to amplify the tiny differential load cell output voltages into usable voltage signal levels for the electronics.

Each instrumentation amplifier 70 includes a resistive potentiometer 74 that is used to adjust for a constant differential output level to an applied reference weight load resting on each respective load cell. The purpose is not only to amplify the tiny differential voltages generated via any deformation of the load cell's internal Wheatstone Bridge, but also to equalize the voltage outputs that result from each load cell 14 and 16. Each and every load cell 14–20 needs to generate the same relative output voltage for the same load placed on it. Load cell output is measured in mV/Volt. This output relationship is a physical property of a load cell and varies from one load cell to the next.

The low-pass filter 72 is used to eliminate all higher frequency vibrations that the load cell is physically subjected to. The larger the capacity of a load cell without weight loading (due to its typically larger mass), the higher is its natural ringing frequency. When a "singular" load cell bears a constant load, such as a weighing platform, the natural ringing frequency of the resulting "system" is reduced; the weighing platform acts as a fixed load. However, when two load cells are connected via a rigid member and attached to a common supporting base, the resulting natural frequency of the assembly now is increased again; a "new" load cell fixture has been created. Aside from the "new" load cell fixture's own natural ringing frequency when subjected to a "step-function" of applied load, there may also be ambient vibration noise that can introduce high-frequency components. Both "new" resulting load cell fixtures should be balanced for optimal vibration noise cancellation with respect to their resulting natural ringing frequencies. For the "active" load cell assembly we have load cells 14 and 16, weighing platform 22 and object 28 shown in FIG. 1. For the "passive" load cell assembly we have load cells 18 and 20, rigid member 24 and passive load 26.

The output from the low pass filters 72 represented at nodes E1 and E2 and are passed, respectively, to an operational amplifier 76 each of which has an output H1 or H2.

These outputs at nodes E1 and E2 are input, respectively, into the negative input of each operational amplifier 76. A voltage adjustment is input into the direct input by a resistive potentiometer 78 which can be adjusted to provide an offset adjustment for the weight of the weighing platform 22, the rigid member 24, and the passive load 26. The outputs H1 and H2 are supplied through resistors to a direct input of a summing operational amplifier 80 which has an output J1. The output J1 is fed through a resistor to the direct input of a differential amplifier 82.

At the same time, the passive load cells 18 and 20 which pick up vibrations in the vertical or Z plane produce voltage signals which are amplified by instrumentation amplifiers 70 and passed through low pass filters 72, respectively to the negative input of one of two operational amplifiers 76. A voltage adjustment is input into the direct input by a resistive potentiometer 78 which can be adjusted to provide an offset adjustment for the weight of the weighing platform 22, the rigid member 24, and the passive load 26. The outputs H3 and H4 are supplied through resistors to a direct input of a summing operational amplifier 80 which has an output J2. The output J2 is fed through a resistor to the negative input of the differential amplifier 82. This differential amplifier 82 is fundamental to low frequency noise removal.

Figure 4:
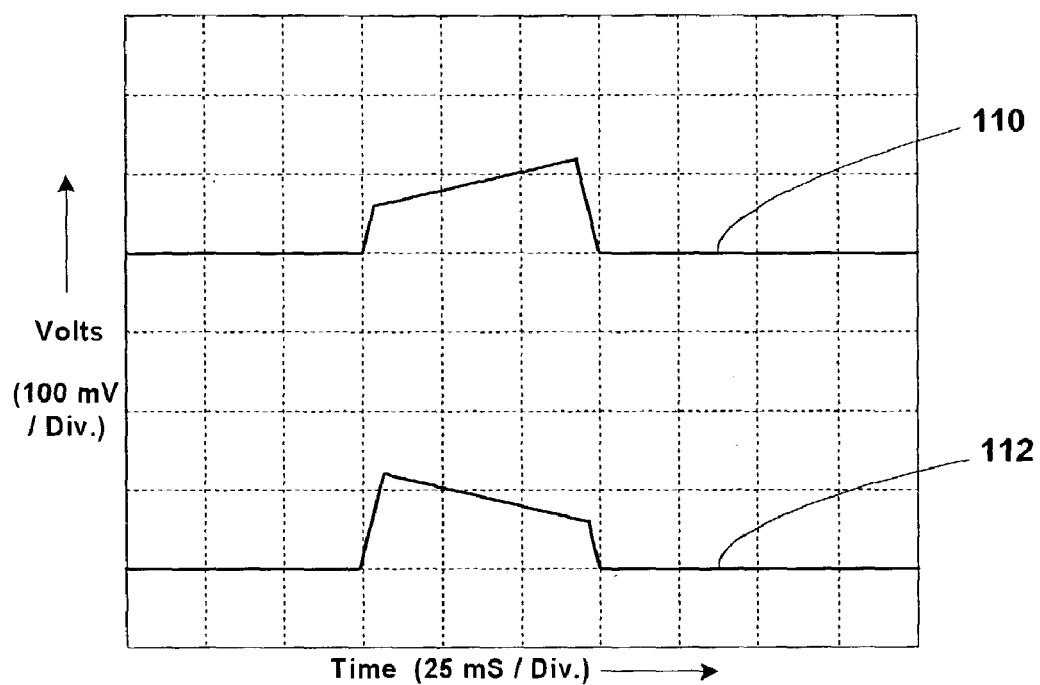
FIG. 4 is a graph of voltage versus time and shows the voltages generated at nodes E1 and E2 in FIG. 2 during the weighing of an object by the two, 180° out of phase, active load cells of the apparatus shown in FIG. 1.

Nodes E1, E2, E3 and E4 are test points where filtered analog output voltages representative of all externally applied weight forces may be monitored. Of the four (4) load cells, two (2) load cells each make up two (2) respective weighing fixtures, the "active" load cells 14 and 16 and the "passive" load cells 18 and 20. Analyzing the active fixture, as the load moves from one end of the weighing platform 22 to the other, the load exerted on each respective load cell will change with the position of the load. With the load positioned above or close to the end of the weighing platform 22 (FIG. 1), the load cell immediately beneath it will realize a maximum load and produce the highest output voltage. The other load cell will realize a minimum load and produce the smallest output voltage. As a load is conveyed across the weigh platform 22 with a constant velocity, one load cell will produce a linear negative ramp in output voltage, while the other will produce a linear positive ramp in output voltage as shown in FIG. 4. Taken together and summed, the outputs produced by each load cell, when the amplifiers are adjusted correctly, will always yield a constant summed voltage outputs at test points J1, J2 for a given representative load, regardless of where the weight load is located on the weighing platform 22.

The unity gain inverting operational amplifiers 76 provide a means for negating the analog weight output voltages presented by the four low pass filters 72.

The resistive potentiometers 78 are used to shift the output voltages from the operational amplifiers 76 to near zero volts as the result of adding fixed weight loads due to the rigid member 24 (FIG. 1) and the weighing platform 22 and the passive weight load 26.

Nodes H1, H2, H3 and H4 are test points that are used to monitor the adjustments of potentiometers 78.

The two unity gain operational amplifier voltage followers 80 are used for summing the two (2) outputs at nodes H1, H2 and H3, H4, respectively, from the operational amplifiers 76.

Nodes J1, J2 are test points for observing the combined conditioned signals resulting from load cells 14–20, respectively.

The differential amplifier 82 subtracts ambient environmental noise vibration felt in the load cells 18 and 20 from similar ambient environmental noise vibration signals felt in the load cells 14 and 16 thus leaving only the active weight load response from load cells 14 and 16.

Node L is a test point for observing only the resulting active load analog weight output signal.

The voltage at node L is supplied to a voltage-to-frequency converter 84 that generates an output pulse train 86 at node M with the instantaneous frequency directly proportional to the input analog voltage level. Since most voltage-to-frequency converters require a positive input voltage (no output of negative frequencies), the output voltage level J1 fed to the direct input of differential amplifier 82 should be slightly more positive than the output voltage level J2, in the quiescent state with no applied active weight loads on the load cells 14 and 16, fed to the positive input of differential amplifier 82. This results in a required slightly (non-critical) positive voltage level at test point L.

Since a "gross" weight reading will always be accompanied by a "tare" weight reading, the difference in between these two weight readings represent the "net" weight. Should the input voltage into the voltage-to-frequency converter 84 be negative in nature at test point L, the resulting net weight data will contain a non-linearity error.

The output from the voltage-to-frequency converter 84 is fed to a transmission line driver 88 appropriate to the transmission medium employed to transmit the frequency pulses to a receiver module (FIG. 3) as necessary, unless the receiver module is physically close to the transmitter module. The driver 88 could be for fiber optics, differential lines, coaxial, etc.

It will be understood that the summing of the signals from the four load cells 14–20 will result in a cancellation of noise and vibrations in the X, Y and Z planes thereby to provide a clean, weight indicating, output voltage signal at the output node L of the differential amplifier 82 which has been compensated for noise and vibrations in the X, Y and Z planes.

In FIG. 3 is illustrated a block schematic circuit diagram for a receiver module which can be located close to or at a distance from the transmitting module represented in FIG. 2. As shown, the frequency 86 from the transmitting module is passed through an optical isolator 90 and from there is supplied to both a frequency-to-voltage converter 92 and to one input 93 of an AND gate 94. The output of the frequency-to-voltage converter 92 has a node R where the reconstructed voltage signal can be tested. The voltage signal at the node R can be tested against past converted frequency counts for establishing valid weighing intervals of similar objects.

A weight request signal from a PLC or PC or the edge detecting photoelectric sensor/emitter 42 or 44 is supplied to a first one shot timer 96 having a resistive potentiometer 98 for adjusting the counting window time duration. This potentiometer 98 is adjusted to match the rates of weighing requirements for the object (product) presentation being processed. The clean output from this one shot timer 96 is supplied to another input 100 of the AND gate 94 and to a test node S which is a test point for measuring the time interval of the first one shot timer 96. The time interval determines for how long the accumulation of frequency data pulses is permitted. It is also used to verify that a binary ripple counter 102 is connected to an output 104 of the AND gate 94, and is accumulating frequency data pulses only when the available weight data signal is stable.

The edge detecting signal supplied to the first one shot timer 96 is also applied to a second one shot timer 106 having a Q-NOT output connected to a reset port of the binary ripple counter 102. The binary ripple counter 102 can have a count from 0 to 65,000.

The optical isolator 90 is used when receiving frequency pulses over large distances. The primary purpose is to eliminate ground loops. Even for short distances it would be advisable to use the optical isolator 90, if for no other reason than to isolate power supplies.

The frequency-to-voltage converter 92 is desirable though not required. It is an excellent tool to assure alignment of the weight envelope against the pulse counting interval established with the one shot timer 96, when the receiver module is at a significant distance from the transmitter module.

The node R is a test point for viewing the reconstructed analog weight envelope.

The node S is a test point for measuring the time interval of the one shot timer 96. The time interval determines for how long the accumulation of frequency data pulses is permitted. It is also used to verify that the binary ripple counter 102 is accumulating frequency data pulses only when the available weight data is stable.

The AND gate 94 will pass frequency pulses to the binary ripple counter 102 if and only if the one shot timer 96 enables the counting time interval. Frequency data pulses are otherwise always present at the input 93 of the AND gate 94.

The binary ripple counter 102 counts the frequency data pulses representative of the weight load data and results in up to a sixteen (16) bit data count which can be processed by a PLC (programmable logic controller) or some other computing device like an industrial PC (personal computer.) The binary ripple counter 102 is reset when a request for the next weight data sample is issued by a PLC/industrial PC/or an edge detector sensing that an item is in position to be weighed.

The second one shot timer 106 generates a very short time pulse from the Q-NOT output for the purpose of resetting the count in the binary ripple counter 102 to zero. It is triggered by a request for weight data, whether it represents tare data or gross data.

The one shot timer 96 establishes the frequency count duration time interval when weight frequency data pulses can be accumulated in the binary ripple counter 102. This time interval is provided with the Q output and controls the gating to the AND gate 94. The time interval duration can further be adjusted or fine tuned via the resistive potentiometer 98 and this setting is a pure function of the rate of weight data acquisitions required per second for the respective product presentation. When the count duration time interval expires, the Q-NOT output is asserted to notify the PLC/industrial PC that the output levels of the binary ripple counter 102 is stable and valid.

Referring now to the graphic representation of the wave forms at different points in the transmitting circuit and the receiving circuit, the voltage at node E1 is shown at 110 in FIG. 4. The voltage at node E2 which is combined with the voltage at node E1 is also shown in FIG. 4 at 112.

Figure 5:
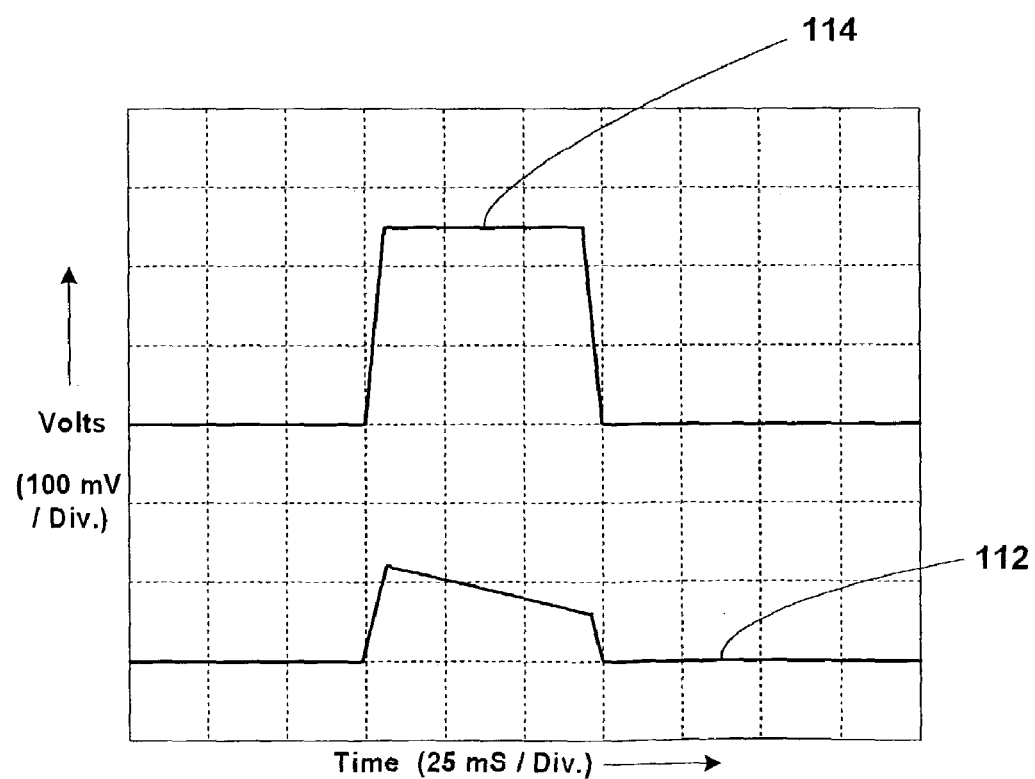
FIG. 5 is a graph of voltage versus time and shows the voltage generated at a node J1 by the summing of the voltages at E1 and E2 versus the voltage at E2 during the weighings of one object by the two, 180° out of phase, active load cells of the apparatus shown in FIG. 1.

The combined signal, i.e., the voltage at H2 and the voltage at H1 which appears at the node J1, is shown at 114 in FIG. 5 and is compared with the voltage at node H2 shown at 112 in FIG. 5.

In FIG. 6, the voltage at node R is shown at 116. The voltage pulse 118 in voltage waveform 116 has a non-stable leading edge and a non-stable trailing edge. The middle, stable voltage of this pulse 118 is compared with the Q output of the first one shot timer 96 which has a square wave shape as shown at 120 so that only the stable, middle portion of the voltage pulse 118 at the node R is used to obtain an accurate, clean measurement of the weighing of the object 28.

Figure 7:
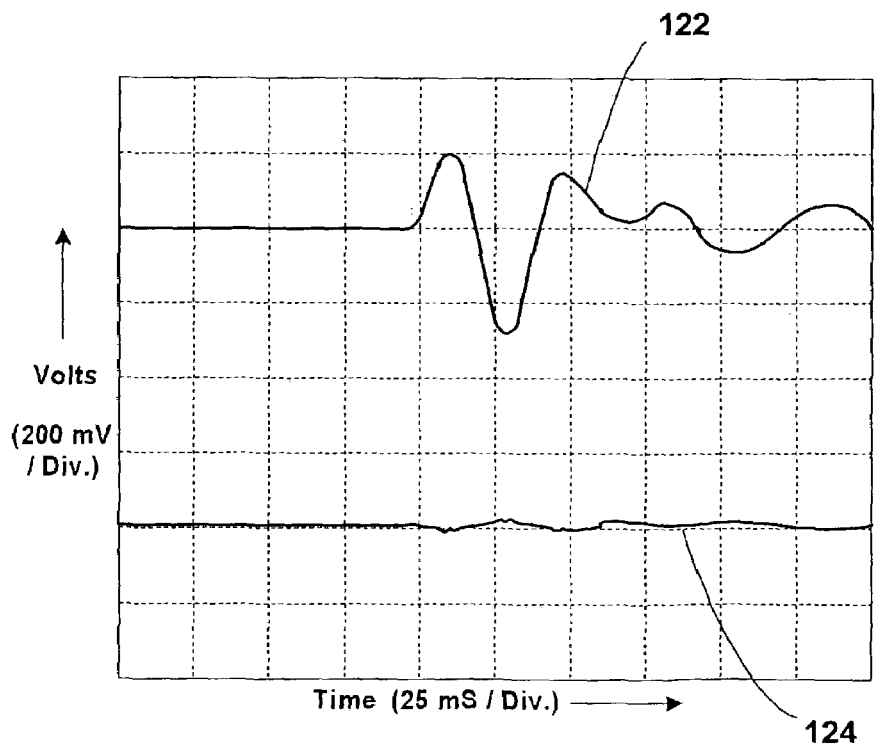
FIG. 7 is an example of a graph of voltage versus time and shows the noise voltage generated at node J2 when no object is present to be weighed versus the voltage at node L at the output of a differential amplifier which sums the voltages at nodes J1 and J2 shown in FIG. 2.

FIG. 7 shows the comparison of a voltage waveform 122 from noise at node J2 with the voltage at node L shown at 124 when there is no weight on the weighing platform 22. A similar voltage waveform 122 is also present at node J1.

Figure 8:
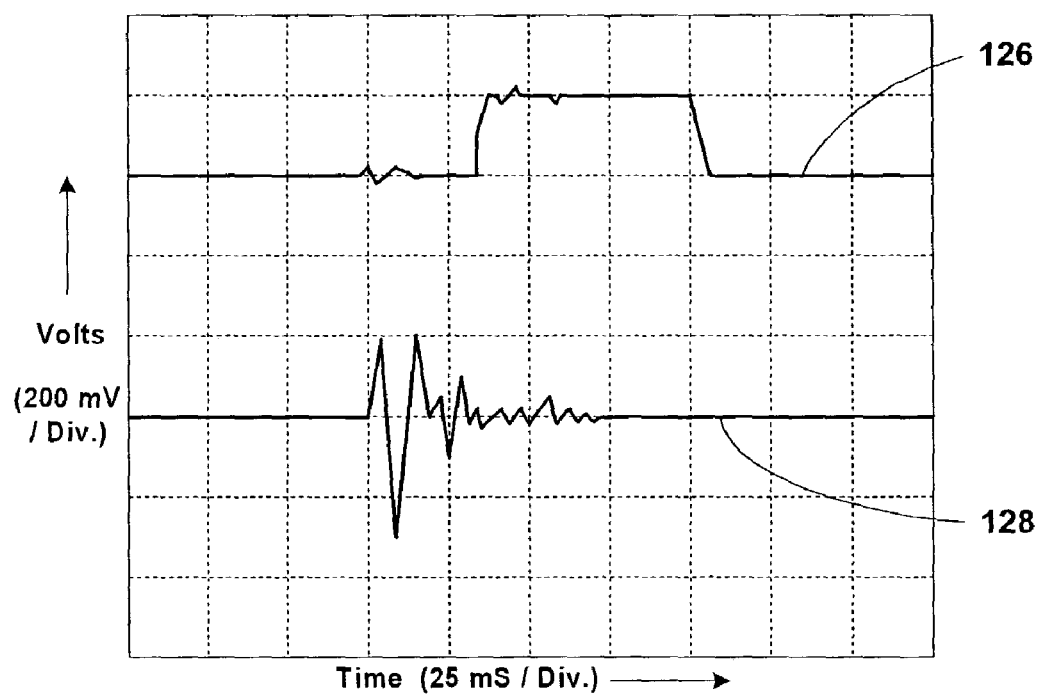
FIG. 8 is an example of a graph of voltage versus time and shows the noise voltage generated at node J2 when an object is present to be weighed versus the voltage at node L at the output of a differential amplifier which sums the voltages at nodes J1 and J2 shown in FIG. 2 when an object is present on the active load cells for weighing.

The voltage signal at node L when an object or item 28 is being weighed on the weighing platform is shown by the waveform 126 in FIG. 8. This waveform 126 is compared with the noise signal at the node J2 when an object or item 28 is present on the weighing platform 22, as shown at 128 in FIG. 8. A similar voltage waveform 128 would also be present in the active weight data at node J1.

From the foregoing description, it will be appreciated that the weighing apparatus 10 and method of the present invention described above have a number of advantages some of which have been described above and others of which are inherent in the invention.

Also, it will be understood that modifications can be made to the weighing apparatus and method of the present invention without departing from the teachings of the present invention.

Accordingly, the scope of the present invention is only to be limited as necessitated by the accompanying claims.

I claim:

1. In a static or dynamic weighing apparatus for weighing an object or item statically or moving in a linear path comprising:
    a weighing assembly including a base, two identical first and second active load cells rigidly mounted on the base, and
    a weighing platform rigidly mounted on both of the load cells,
    the improvement residing in said second active load cell being spaced from said first active load cell and having a 180° orientation relative to the first active load cell, and said apparatus further including a first and a second passive load cells spaced from each other and spaced from said first and second active load cells, said first and second passive load cells being mounted on said base, a rigid member rigidly fixed to said first and second passive load cells and said first and second passive load cells being inline with and spaced from said first and second active load cells and having the same orientation as first and second active load cell and and a passive load being fixed to said weighing platform and said load being representative of the weight of an object to be weighed by said first and second active load cells, and circuitry for subtracting the voltage waveform generated by the passive load on said first and second passive load cells from a voltage waveform generated by the weight of an object weighed by said first and second active load cells to obtain a more accurate weight of the object being weighed and for converting the voltage indicative of the weight of the object to an always present frequency train a portion of which is counted over a selected time period to obtain an averaged count indicative of the weight of the object weighed.

2. In a static or dynamic weighing apparatus for weighing an object or item, statically or moving in a linear path, comprising:
    a weighing assembly including a base,
    four identical load cells rigidly mounted to the base comprising a first active load cell and a second active load cell, a first passive load cell and a second passive load cell,
    a first weighing platform rigidly mounted to both said first active load cell and said second active load cell, and a second weighing platform rigidly mounted to both said first passive load cell and said second passive load cell,
    each of said four load cells having a mounting side and a weighing side with said mounting side for all four load cells being rigidly fixed to said base,
    the improvement residing in said first weighing platform being rigidly fixed to said first active load cell and said second active load cell, and said second weighing platform being rigidly fixed to said first passive load cell and said second passive load cell, respectively, said second active load cell being horizontally rotated 180° relative to said first active load cell, and said second passive load cell being horizontally rotated 180° relative to said first passive load cell, respectively, said first and second active load cells being spaced from each other, said first and second passive load cells being spaced from each other by the same separation as established between said first and second active load cells, the centerlines of said active and passive weighing platforms being parallel to each other, both said passive load cells being spaced from said active load cells with said passive weighing platform containing a passive load comparable to that of an object or item to be weighed on the active weighing platform, thereby to generate inverse signals between the first and second active load cells, and between the first and second passive load cells, respectively, in the horizontal plane when an object is placed on or passes over said first weighing platform, and circuitry associated with said active load cells and said passive load cells for adding output signals from both said first and second active load cells and for subtracting a passive output signal from said first and second passive load cells from the added active output signals to obtain a highly accurate voltage signal indicative of an object or item being weighed, thereby also eliminating any normal forces due to vertical vibration since any vertical vibration introduced into said apparatus will be equally transmitted to both said active and passive weighing platforms, and circuitry for converting the voltage indicative of the weight of the object or item to an always present frequency train a portion of which is counted over a selected time period to obtain an averaged count indicative of the weight of the object or item weighed.

3. A method for weighing an object or item, individually or sequentially, statically or moving in a linear path, with two, spaced apart, first and second active load cells, comprising the steps of:
    mounting the two active load cells on a base;
    rigidly fixing an active weighing platform to both the active load cells;
    orienting the second active load cell 180° horizontally with respect to the first active load cell;
    mounting two additional passive load cells to the same base;
    orienting the second passive load cell 180° horizontally with respect to the first passive load cell, the two passive load cells being spaced identically as the two active load cells and spaced from and in-line with respective ones of the two active load cells;
    rigidly fixing a passive weighing platform to both passive load cells;
    providing a passive load rigidly connected to the passive weighing platform;
    providing the passive load cell arrangement with a passive weight attached to same simulating a comparable load to an object or item to be weighed and to negate any externally introduced vibrations subjected onto the weighing apparatus resulting from any horizontal or normal forces presented to the weighing apparatus in the weighing environment;
    subtracting a passive voltage signal generated by circuitry associated with the passive load cells from an active voltage signal generated from circuitry associated with the active load cells with differential amplifiers knowing that any externally introduced forces must be equally transmitted to both the active weighing platform and the passive weighing platform;
    weighing an object or item;
    obtaining a first voltage signal due to the load over the active load cells and converting the resulting voltage signal to an always present frequency train a portion of which is counted over a selected time period to obtain an first average count indicative of the weight of the object or item weighed;
    supplying the first averaged count to a computer;

obtaining a second voltage signal without an object or item on or over the active load cells;

converting the resulting voltage signal to an always present frequency train a portion of which is counted over a selected time period to obtain a second averaged count indicative of no weight;

supplying the second averaged count to the computer; and, subtracting the second averaged count (tare weight) from the first averaged count (gross weight), to determine the true weight (net weight) of the object or item being weighed.

4. The weighing apparatus of claim 1, wherein each active load cell and each passive load cell has a mounting side and a weighing side, said active load cells being parallel spaced from each other beneath said weighing platform and arranged 180° degrees relative to each other thereby to produce inverse error weighing signals in the horizontal Plane when weighing an object.

5. The weighing apparatus of claim 1, wherein each of said active and passive load cells has a load capacity of X gm for weighing items having 15% X gm or less of the load capacity of the load cell to minimize hysteresis, ringing, and deformation.

6. The weighing apparatus of claim 2, wherein each of said active and passive load cells has a load capacity of X gm for weighing items having 15% X gm or less of the load capacity of the load cell to minimize hysteresis, ringing, and deformation.

7. The weighing apparatus of claim 1 wherein said circuitry includes an operational amplifier having an adjustable input whereby the adjustable input can be set to a value to offset the weight of said platforms, and the passive load.

8. The method of claim 3 including the step of only using 15% or less of the capacity of the active load cells in performing weighings to minimize hysteresis, ringing, and deformation.

9. The method of claim 3 including the step of adding the respective voltages generated by the two active load cells to each other.

10. The method of claim 3 including the step of adding the respective voltages generated by the two passive load cells to each other.

11. The method of claim 3 including the step of subtracting the respective voltages generated by the two passive load cells from the respective voltages generated by the two active load cells to obtain a clean accurate voltage indicative of the weight of the object.

12. The method of claim 11 including the step of converting the resulting voltage to the always present frequency train using a voltage to frequency converter.

13. The method of claim 12 including the step of counting the always present frequency train in an area where the count over a selected time interval is a stable representation of the voltage signal from which the frequency train was generated.

14. The method of claim 13 including the step of only using 15% or less of the capacity of the active load cells in performing weighings to minimize hysteresis, ringing, and deformation.

15. The method of claim 3 including the step of modifying said resultant voltage signal relative to the weight of the active and passive weighing platforms, and the passive load.

16. The weighing apparatus of claim 1, wherein said circuitry is operable to count a portion of said frequency train over a fixed time period interval thereby to perform an averaging function of the weight of the item being weighed.

* * * * *